United States Patent [19]

Inoue et al.

[11] 4,409,268
[45] Oct. 11, 1983

[54] LIQUID CRYSTAL DISPLAY PANELS AND PROCESS FOR THEIR PRODUCTION

[75] Inventors: Hiroshi Inoue; Nobuo Tooyama, both of Ena, Japan

[73] Assignee: Ricoh Company, Ltd., Tokyo, Japan

[21] Appl. No.: 212,731

[22] PCT Filed: Mar. 17, 1980

[86] PCT No.: PCT/JP80/00045

§ 371 Date: Nov. 5, 1980

§ 102(e) Date: Nov. 5, 1980

[87] PCT Pub. No.: WO80/02079

PCT Pub. Date: Oct. 2, 1980

[30] Foreign Application Priority Data

Jul. 13, 1979 [JP] Japan ................................. 54-89665
Jul. 19, 1979 [JP] Japan ................................. 54-32000
Oct. 12, 1979 [JP] Japan ................................. 54-131985
Oct. 26, 1979 [JP] Japan ................................. 54-139052

[51] Int. Cl.$^3$ ............................................. G09K 3/34
[52] U.S. Cl. ..................................... 428/1; 427/331; 427/335; 427/368
[58] Field of Search ................... 428/1; 350/160 LC; 427/331, 355, 368

[56] References Cited

U.S. PATENT DOCUMENTS 3,961,843  6/1976  Nakamura et al. .......... 350/160 LC
3,991,241 11/1976  Matsumoto et al. .................... 428/1
4,043,647  8/1977  Que et al. ................................ 428/1
4,132,464  1/1979  Maeno .................................... 428/1

FOREIGN PATENT DOCUMENTS 51-46966   4/1976  Japan .
51-56651   5/1976  Japan .
52-148153 12/1977  Japan .
53-18398   2/1978  Japan .
53-20946   2/1978  Japan .
53-33642   3/1978  Japan .

OTHER PUBLICATIONS

Levine et al., Electrochemical Society, vol. 76-2, Oct. 1976, p. 559.
IBM Technical Disclosure Bulletin, vol. 21, Apr. 1979, pp. 4724-4726.

Primary Examiner—Marion McCamish
Attorney, Agent, or Firm—Oblon, Fisher, Spivak, McClelland & Maier

[57] ABSTRACT

In a liquid crystal display panel in which a plastic film provided with a transparent conductive film is used as a panel substrate, the liquid crystal display panel having an orientation treated film mainly of a saturated polyester or a low melting point copolymerized nylon, and a process for its production.

This invention enables the use of a transparent plastic film as a substrate for a liquid crystal display panel, thereby permitting inexpensive mass production of high quality liquid crystal display panels.

17 Claims, No Drawings

LIQUID CRYSTAL DISPLAY PANELS AND PROCESS FOR THEIR PRODUCTION

TECHNICAL FIELD

This invention relates to liquid crystal display panels which employ plastic films having improved orientation treated films as panel substrates (hereinafter referred to as "plastic panels") and a process for their production.

BACKGROUND ART

Panel substrates used for conventional liquid crystal display panels have been exclusively made of inorganic glass, and plastic panels have not yet been put to practical use. While there are a number of reasons for that, it is, basically, because there are problems involved with orientation treatment in addition to many problems with properties of plastics, sealing agents and sealing methods. These various problems are now being ameliorated one by one, and this invention is based on the success in establishing a unique orientation treatment technique applicable especially to plastic panels, as the result of our study on, among these various problems, how orientation treatment of plastic panels should be effected instead of an attempt to apply the techniques which have been employed for orientation treatment of inorganic glass panels to plastic panels.

Orientation treatment means employed for inorganic glass panels may be classified into:

(a) a method by angular deposition;
(b) a method by radiation of accelerated ions;
(c) a method by rubbing;
(d) a method by bonding an elongated film;

and so forth. More particularly, the method by rubbing is further classified into a method by rubbing after coating an organic silane compound, a method by rubbing after coating a heat-resistant polymer material, and the like.

However, none of these methods is effective on plastic panels. That is, the method (a), in which $SiO_2$ is deposited on a glass substrate at an angle of up to 65°, requires that the substrate be heated to 200°–300° C., which temperature is more than that plastic films can withstand. Further, the method (b), in which accelerated ions are radiated from a shower-like ion generator onto a substrate leaning at an angle of up to 65°, not only requires expensive equipments and complicated operation but also cannot achieve mass-productivity and therefore it is unsuitable as orientation means for plastic panels which originally aims mass production and hence reduction in cost.

Further, with the rubbing method (c), organic silanes are poor in adhesion with plastics and in orientation properties, heat-resistant polymer materials which form films having good orientation on glass substrates cannot be adopted because a temperature of 300° C. or higher is employed for film forming, and films of other polymer materials known for glass substrates do not show good orientation properties on plastic panels.

Furthermore, with the method (d), which is to bond an extremely thin monoaxially elongated film, it is quite difficult to bond this extremely thin film on a plastic film without remarkably reducing the resistance value of a conductive film. In either case, any known orientation treatment means for glass substrates is not suitable for plastic panels.

For orientation treatment of plastic panels, various conditions different from those for glass panels are required.

The first requisite is that physically and chemically stable horizontal orientation performance be achieved at a temperature below the maximum temperature up to which a plastic film can withstand, the second requisite is that continuous production be enabled and large-scale equipments or complicated operation be eliminated, and so forth.

It is an object of this invention to provide liquid crystal display panels inexpensively by mass production using orientation treated films, and a process for their production. It is another object of this invention to provide liquid crystal display panels having constantly high quality although by inexpensive mass production. Other objects of this invention are believed to be easily understood from the following description and therefore not mentioned herein.

DISCLOSURE OF THE INVENTION

Accordingly, this invention resides in a liquid crystal display panel in which a plastic film provided with a transparent conductive film of, for example, indium oxide etc. is used as a panel substrate, which is characterized by that an orientation treated film is formed from one component selected from the group consisting of the following (1)-(5):

(1) a saturated polyester;
(2) a reaction product of a saturated polyester and a reinforcing additive;
(3) a mixture of a saturated polyester and nylon;
(4) a reaction product of a saturated polyester, nylon and a reinforcing additive; and
(5) a reaction product of a low melting point copolymerized nylon and a reinforcing additive.

BEST MODE OF CARRYING OUT THE INVENTION

A plastic film to be used in this invention is for example a polyethylene terephthalate film, a polybutylene terephthalate film, a polyether sulfone film, a polycarbonate film etc.

These films are provided with transparent conductive films of, for example, indium oxide, tin oxide and the like, by conventional means to prepare panel substrates.

The saturated polyester which is a linear polymer material having a polar group in the segment has an ability to adhere well to such substrates and to orientate the liquid crystal molecules, and this orientation performance is further enhanced by rubbing the surface.

The saturated polyester mentioned herein includes polyesters obtained by reacting saturated polycarboxylic acids such as terephthalic acid, isophthalic acid, phthalic acid, succinic acid, sebacic acid, diphenyldicarboxylic acid etc. and saturated polyhydric alcohols such as ethylene glycol, diethylene glycol, polyethylene glycol, propylene glycol, trimethylolpropane etc., preferred among which are saturated copolymerized polyesters employing two or more saturated polycarboxylic acids, for example, a polyethylene terephthalate/polyethylene sebacate having a melting point of 80°–160° C. and obtained by reacting 60–20 parts (which means 'parts by weight' and this also applies hereinafter) of terephthalic acid and 40–80 parts of sebacic acid with approximately 100 parts of ethylene glycol.

Such saturated polyesters may be used either alone or in combination with nylon. The nylon used herein means 6-nylon, 6,6-nylon, 12-nylon etc., low melting point copolymerized nylons obtained by copolymerizing those with other monomers or with other polymers and adjusting the melting point to 100°-150° C. being preferred. When a saturated polyester and nylon are to be used in admixture, it is sometimes necessary to employ hexafluoropropanol (HFIP) as a solvent.

Alternatively, a reaction product of the aforementioned nylon and a reinforcing additive, which will be described hereinbelow, may be employed instead of using the saturated polyester.

In this invention, it is also possible in some cases to use, in addition to the aforementioned components, a reactive titanium compound, an isocyanate compound, an epoxy resin, an acid anhydride, a melamine resin etc., i.e., reinforcing additives which increase orientation properties, heat resistance and solvent resistance. Examples of the reactive titanium compound include titanium chelate complexes which are complexes of titanium with carboxylic acids, ketones, polyhydric alcohols etc.; Ti (IV) compounds such as titanium halides, titanium sulfate, cyclopentadienyl titanium compound, titanium alkoxides etc.; and the like. An organic titanate represented by the formula: $Ti(OR)_4$ wherein R is an alkyl group represented by $C_nH_{2n+1}$ and having up to 40 carbon atoms, preferably about 2 to 10 carbon atoms, is usually employed.

By the isocyanate compound is meant a compound containing therein an isocyanate group either alone or in combination with a hydroxyl group, an amino group or a carboxyl group and characterized by the high polarity and reactivity of the isocyanate group.

Examples include tirphenylmethane triisocyanate (the trade name "Desmodur R"), tris(4-phenylisocyanate)thiophosphate (the trade name "Desdemor RF"), the trade names "Coronate L" and "Desmodur L", TDI dimer (the trade name "Desmodur TT"), TDI trimer (the trade name "Desmodur IL"), 2,4,4'-diphenyl ether triisocyanate (the trade name "Hylen DM"), the trade name "Coronate AP" and so forth.

As the epoxy resin, there may be employed any of the glycidyl ether type, glycidyl ester type, glycidyl amine type, cycloaliphatic type and linear aliphatic type, among which a liquid one having an average molecular weight of 300-400 is preferred.

Phthalic anhydride, maleic anhydride or the like is employed as the acid anhydride and an ordinary addition condensate of melamine and formaldehyde is employed as the melamine resin.

The aforementioned reinforcing additives are employed as a sole component or as a mixture of two components in amounts of 0.1-50 parts per part of a saturated polyester or a mixture of a saturated polyester and nylon, the amount being dependent on the kind of the reinforcing additive.

Further, where a reaction product of a low melting point copolymerized nylon with reinforcing additives, i.e. an epoxy resin and a reactive titanium compound is used as an orientation agent, the mixing ratio of the low melting point copolymerized nylon, the epoxy resin and the reactive titanium compound is suitably in such range that the weight ratio of the low melting point copolymerized nylon : the epoxy resin : the reactive titanium compound is 2-3:1:20-100.

Still further, where a reaction product of a low melting point copolymerized nylon with reinforcing additives, i.e. an isocyanate compound and a reactive titanium compound is used as an orientation agent, the mixing ratio of the low melting point copolymerized nylon, the isocyanate compound and the reactive titanium compound is suitably in such range that the weight ratio of the low melting point copolymerized nylon : the isocyanate compound : the reactive titanium compound is 2-5:1:100-200.

The means to form a film of the aforementioned orientation agent components on a panel substrate may be such that one of the above components (1)-(5) is dissolved in a solvent to make a solution of a concentration of the orientation agent components of 0.1-5% by weight and it is then applied to a panel substrate by conventional application means such as impregnation, spraying etc. It is preferred to use the solution after filtering through a filter, because the transmission is increased. As the solvent, there may be employed highly volatile solvents having boiling points of up to 150° C., such as methanol, ethanol, isopropyl alcohol, chloroform, methylene chloride, trichlene, acetone, methyl ethyl ketone, ethyl acetate, tetrahydrofuran (THF), haloalcohols, e.g. hexafluoropropanol (HFIP). Among those, methanol, ethanol and isopropyl alcohol are particularly preferred. With a solvent such as phenol, toluene, dioxane etc., although a solution of the orientation agent can be formed, a large amount of the solvent remains on forming an oriented film.

The panel after the orientated film has been formed is then treated by rubbing. Rubbing treatment may be accomplished by rubbing the panel using cotton cloth in one direction under a static pressure of 0.1-1.3 kg/cm$^2$.

Thereafter, a TN type nematic liquid crystal of $\Delta\epsilon>0$ or $\Delta\epsilon<0$ is injected in a known manner, thereby a liquid crystal display panel is prepared.

The orientation treatment of the liquid crystal display panels in accordance with this invention does not require any special equipments such as a vacuum device, a high voltage electricity source etc., can easily be performed continuously in a mass production scale by an impregnation method or a spraying method, does not need high temperatures for forming orientated films and produces physically and chemically stable horizontally orientated films. Therefore, according to this invention, liquid crystal display panels exhibiting performance satisfactory for practical use can be obtained using plastic panels as substrates by extremely simplified means as compared with the orientation treatments which have been employed for inorganic glass panels.

This invention is more particularly described in the following examples; this invention is however not intended to be restricted thereto unless departed from its scope.

EXAMPLE 1

A plastic panel of a polyethylene terephthalate film of 75μ provided with a transparent conductive film mainly formed of indium oxide was impregnated with a solution consisting of the following components, and dried with hot air to remove the solvent.

| Composition of the orientation treatment solution | |
|---|---|
| | (parts by weight) |
| Linear high molecular weight saturated polyester (the trade name "Vylon 30 P" | 0.5 part |

| Composition of the orientation treatment solution | |
|---|---|
| | (parts by weight) |
| produced by Toyo Spinning) | |
| Methylene chloride | 100 parts |

Further, after heating at 130° C. for 20 minutes, the panel surface was rubbed with cotton cloth in one direction with pressing at 1 kg/cm². A biphenyl type liquid crystal (E-7 produced by BDH Co.) was injected between a pair of panels placed one on the other so that the rubbing directions were in the right angle to each other, and when the optical rotation angle was measured at room temperature and at a humidity of 65%, it was found that the transmitted light had been optically rotated to 85–95°.

EXAMPLE 2

A liquid crystal display panel was prepared by the same procedures as in Example 1 except that 100 parts of dioxane was used instead of methylene chloride in Example 1 and the heating for drying was effected at 120° C. for 15 minutes and then at 150° C. for 30 minutes. Although the transmitted light had been rotated to 80–90°, dioxane still remained in a large amount in the orientated film, and therefore the film assumed surface tackiness and some cotton cloth adhered during rubbing.

EXAMPLE 3

A plastic panel substrate of a polyethylene terephthalate film of 75μ provided with a transparent conductive film mainly formed of indium oxide was impregnated with a solution obtained by reacting the following components and then dissolving in 2000 parts of a solvent, and successively dried with hot air to remove the solvent.

| Composition of the orientation treatment solution | |
|---|---|
| | (parts by weight) |
| Low melting point copolymerized nylon | 15 parts |
| Epoxy resin (Shell Epikote 815) | 5 parts |
| TOT [tetrakis(2-ethylhexoxy)titanium] | 100 parts |

Thereafter, the panel was rubbed with cotton cloth in one direction with pressing at 1 kg/cm². Two panels were placed one on the other so that the rubbing directions were at the right angle to each other, a biphenyl type liquid crystal (E-7 produced by BDH Co.) was injected between the substrates, and the orientation performance of the liquid crystal in the horizontally orientated state in the non-electrical field was examined by measuring the transmission or reflectance of the panel using a luminance meter.

The results of the test are shown below.

| Results of the Orientation Test | |
|---|---|
| Items Tested | Conditions of Orientation |
| Initial orientation | Good |
| After 90 min. at 100° C. | Good |
| After 60 min. at 130° C. | Good |
| After 60 min. at 150° C. | Good |
| After 30 min. at 180° C. | Good |
| At room temperature and 90% humidity | Good |

After the 24-hour test, there was no abnormality found with the orientation conditions in either case.

EXAMPLE 4

Using a polycarbonate film of 75μ as a plastic substrate, a test was conducted in a similar manner as in Example 3. The obtained test results in this case were similar to those of Example 3.

EXAMPLE 5

Using a polyether sulfone film of 75μ as a plastic substrate, a test was conducted in a similar manner as in Example 3. The obtained test results in this case were similar to those of in the preceeding two examples.

EXAMPLE 6

A polyether sulfone film of 75μ was provided with a transparent conductive film mainly formed of indium oxide, and a product obtained by reacting the following components was added with and dissolved in 3000 parts of a solvent.

| Composition of the orientation treatment solution | |
|---|---|
| | (parts by weight) |
| Low melting point copolymerized nylon (peak melting point 115° C.) | 15 parts |
| Epoxy resin (Shell Epikote 815) | 5 parts |
| TBT (tetrabutyl titanate) | 250 parts |

The panel was impregnated with the orientation treatment solution, dried with hot air to remove the solvent and, after heating at 170° C. for 30 minutes, it was rubbed with cotton cloth in one direction with pressing at 1 kg/cm². The test results thus obtained are as follows:

| Results of the Orientation Test | |
|---|---|
| Items Tested | Conditions of Orientation |
| Initial orientation | Good |
| After 90 min. at 100° C. | Good |
| After 60 min. at 130° C. | Good |
| After 60 min. at 150° C. | Good |
| After 30 min. at 180° C. | Good |
| After 60 min. at 170° C. | Good |
| After 24 hours at room temperature and 90% humidity | Good |

COMPARATIVE EXAMPLE 1

A polyethylene terephthalate film of 75 μ was used as a plastic substrate and provided with a transparent conductive film mainly formed of indium oxide, after which it was impregnated with an orientation treatment solution obtained by dissolving 7 parts (by weight) of a low melting point copolymerized nylon (peak melting point 103° C.) in 100 parts of a solvent, followed by drying with hot air to remove the solvent. Thereafter, it was heated at 150° C. for 30 minutes and then rubbed with cotton cloth in one direction with pressing at 1 kg/cm². Then, a test was conducted in a similar manner as in Example 3. The test results were such that the heat resistance at 130° C. for 30 minutes was poor, although the initial orientation was good.

Results of the Orientation Test

| Items Tested | Conditions of Orientation |
|---|---|
| Initial orientation | Good |
| After 90 min. at 100° C. | Good |
| After 30 min. at 130° C. | Poor |
| After 10 min. at 150° C. | Poor |
| After 24 hours at room temperature and 90% humidity | Good |

COMPARATIVE EXAMPLE 2

Plastic panels were prepared using the following (1) to (4) as orientation treatment solutions, respectively, and in a similar manner as in Example 3.

(1) a 0.05% γ-aminopropyltriethoxysilane/ethanol solution;
(2) a 0.1% γ-methacrylethoxypropyltrimethoxysilane/ethanol solution;
(3) a 0.05% N-β-(N-vinylbenzylamine)ethyl-γ-aminopropyltrimethoxysilane/ethanol solution; and
(4) a 1.0% β-(3,4-epoxycyclohexyl)ethyltrimethoxysilane/ethanol solution.

The results of the orientation test of the products thus obtained are as follows:

Results of the Orientation Test

| Items Tested | (1) | (2) | (3) | (4) |
|---|---|---|---|---|
| Initial Orientation | x | x | o | o |
| After 10 min. at 80° C. | — | — | o | o |
| After 10 min. at 100° C. | — | — | x | x |

Notes
o: The orientation is good.
x: The orientation is entirely poor.

As is clear from the foregoing examples and comparative examples, it can be seen that the components of this invention have far better performance as compared with silane compounds capable of forming orientated films at 150° C. or below.

EXAMPLE 7

A liquid crystal display panel prepared similarly as in Example 3, except that the following components were dissolved in 900 parts of a solvent was tested for its orientation performance, to obtain results similar to those of Example 3.

| Composition of the orientation treatment solution | (parts by weight) |
|---|---|
| Low melting point copolymerized nylon (peak melting point 123° C.) | 4 parts |
| Isocyanate compound (the trade name "Desmodur R") | 1 part |
| TOT [tetrakis(2-ethylhexoxy)titanium] | 130 parts |

EXAMPLE 8

The following components were dissolved in chloroform and a liquid crystal display panel was prepared in a similar manner to that in Example 3.

| Composition of the orientation treatment solution | (parts by weight) |
|---|---|
| Linear high molecular weight saturated polyester (the trade name "Vylon 30 P") | 2 parts |
| Epoxy resin (Shell Epikote 815) | 0.6 part |
| TOT [tetrakis(2-ethylhexoxy)titanium] | 20 parts |

The transmission was measured similarly as in Example 3, to obtain similar results to those of the same example.

EXAMPLE 9

The following components were dissolved in tetrahydrofuran and a liquid crystal display panel was prepared in a similar manner to that in Example 3.

| Composition of the orientation treatment solution | (parts by weight) |
|---|---|
| Linear high molecular weight saturated polyester (the trade name "Vylon 30 P") | 4 parts |
| Isocyanate compound (the trade name "Desmodur R") | 1 part |
| TOT [tetrakis(2-ethylhexoxy)titanium] | 130 parts |

The transmission was measured similarly as in Example 3, to obtain similar results to those of the same example.

COMPARATIVE EXAMPLE 3

The following components were dissolved in ethyl alcohol and a liquid crystal display panel as prepared by similar procedures to those in Example 3.

| Composition of the orientation treatment solution | (parts by weight) |
|---|---|
| Epoxy resin (Shell Epikote 815) | 0.1 part |
| TOT [tetrakis(2-ethylhexoxy)titanium] | 2.5 parts |

When the composition was coated on a plastic substrate similarly as in Example 3, it did not give a transparent film but gelled and whitened. Further, after heating and subjecting to rubbing treatment etc. as in Example 3, the aging properties of the product were measured, to find that the orientation performance of 80% or more of the panel had been reduced after 30 minutes at 150° C.

INDUSTRIAL APPLICABILITY

By this invention, since it is possible to use transparent plastic films such as polyethylene terephthalate films as panel substrates, production of liquid crystal display panels using tape-shaped transparent plastic films is enabled. Therefore, liquid crystal display panels can be produced by mass production and inexpensively, thus contributing to further expansion of their application.

We claim:
1. In a liquid crystal display panel in which a plastic film provided with a transparent conductive film is used as a panel substrate, the improvement of a liquid crystal display panel which is characterized by an orientation treated film on said substrate which is formed from a reaction product of a saturated polyester and a reinforcing additive which is one or more components selected from the group consisting of a reactive titanium com- pound, an isocyanate compound, an acid anhydride and a melamine resin.

2. The liquid crystal display panel of claim 1, wherein the orientation treated film is formed of a reaction product of a saturated polyester, an isocyanate compound and a titanium compound.

3. In a liquid crystal display panel in which a plastic film provided with a transparent conductive film is used as a panel substrate, the improvement of a liquid crystal display panel which is characterized by an orientation treated film on said substrate which is formed from a mixture of a saturated polyester and a low melting point copolymerized nylon.

4. In a liquid crystal display panel in which a plastic film provided with a transparent conductive film is used as a panel substrate, the improvement of a liquid crystal display panel which is characterized by an orientation treated film on said substrate which is formed from a reaction product of a saturated polyester, a low melting point copolymerized nylon and a reinforcing additive which is one or more components selected from the group consisting of a reactive titanium compound, an isocyanate compound, an epoxy resin, an acid anhydride and a melamine resin.

5. In a liquid crystal display panel in which a plastic film provided with a transparent conductive film is used as a panel substrate, the improvement of a liquid crystal display panel which is characterized by an orientation treated film on said substrate which is formed from a reaction product of a low melting point copolymerized nylon and a reinforcing additive which is one or more components selected from the group consisting of a reactive titanium compound, an isocyanate compound, an epoxy resin, an acid anhydride and a melamine resin.

6. The liquid crystal display panel of claim 5, wherein the orientation treated film is formed of a reaction product of a low melting point copolymerized nylon, an epoxy resin and a titanium compound.

7. The liquid crystal display panel of claim 5, wherein the orientation treated film is formed of a reaction product of a low melting point copolymerized nylon, an isocyanate compound and a titanium compound.

8. In a liquid crystal display panel in which a plastic film provided with a transparent conductive film is used as a panel substrate, the improvement of a liquid crystal display panel which is characterized by an orientation treated film on said substrate which is formed from a reaction product of a saturated polyester, an epoxy resin and a titanium compound.

9. A process for producing a liquid crystal display panel which is characterized by dissolving in a solvent a reaction product of a low melting point copolymerized nylon and a reinforcing additive which is one or more components selected from the group consisting of a reactive titanium compound, an isocyanate compound, an epoxy resin, an acid anhydride and a melamine resin, coating said component on a panel substrate comprising a plastic film and a transparent conductive film, drying to prepare an orientation treated film, and successively subjecting it to rubbing treatment.

10. The process as set forth in claim 9, wherein the dissolved component is a reaction product of a low melting point copolymerized nylon, an epoxy resin and a titanium compound.

11. The process as set forth in claim 9, wherein the dissolved component is a reaction product of a low melting point copolymerized nylon, an isocyanate compound and a titanium compound.

12. The process as set forth in claim 9, wherein the dissolved component is a reaction product of a saturated polyester, an isocyanate compound and a titanium compound.

13. A process for producing a liquid crystal display panel which is characterized by dissolving in a solvent a reaction product of a saturated polyester and a reinforcing additive which is one or more components selected from the group consisting of a reactive titanium compound, an isocyanate compound, an acid anhydride and a melamine resin, coating said component on a panel substrate comprising a plastic film and a transparent conductive film, drying to prepare an orientation treated film, and successively subjecting it to rubbing treatment.

14. A process for producing a liquid crystal display panel which is characterized by dissolving in a solvent a mixture of a saturated polyester and a low melting point copolymerized nylon, coating said component on a panel substrate comprising a plastic film and a transparent conductive film, drying to prepare an orientation treated film, and successively subjecting it to rubbing treatment.

15. A process for producing a liquid crystal display panel which is characterized by dissolving in a solvent a reaction product of a saturated polyester, a low melting point copolymerized nylon and a reinforcing additive which is one or more components selected from the group consisting of a reactive titanium compound, an isocyanate compound, an epoxy resin, an acid anhydride and a melamine resin, coating said component on a panel substrate comprising a plastic film and a transparent conductive film, drying to prepare an orientation treated film, and successively subjecting it to rubbing treatment.

16. The process for producing a liquid crystal display panel as set forth in any of claims 9, 13, 14 or 15 wherein the solvent is a highly volatile solvent having a boiling point of up to 150° C.

17. A process for producing a liquid crystal display panel which is characterized by dissolving in a solvent a reaction product of a saturated polyester, an epoxy resin and a titanium compound, coating said component on a panel substrate comprising a plastic film and a transparent conductive film, drying to prepare an orientation treated film, and successively subjecting it to rubbing treatment.

* * * * *